US00RE40059E

(19) United States
(12) Reissued Patent
Pacifico et al.

(10) Patent Number: US RE40,059 E
(45) Date of Reissued Patent: Feb. 12, 2008

(54) SENSITIVE SUBSTANCE ENCAPSULATION

(75) Inventors: Carl J. Pacifico, West Milford, NJ (US); Wen-Hsin Wu, Middletown, NY (US); Marta Fraley, Parksville, NY (US)

(73) Assignee: Balchem Corporation, New Hampton, NY (US)

(21) Appl. No.: 09/996,636

(22) Filed: Nov. 29, 2001

(Under 37 CFR 1.47)

Related U.S. Patent Documents

Reissue of:
(64) Patent No.: 6,251,478
Issued: Jun. 26, 2001
Appl. No.: 09/469,368
Filed: Dec. 22, 1999

(51) Int. Cl.
*B01J 13/02* (2006.01)
*A61K 9/16* (2006.01)
*B65B 1/04* (2006.01)

(52) U.S. Cl. ..... 427/213.3; 424/1.29; 424/1.69; 424/1.73; 424/451; 424/463; 424/490; 424/491; 424/493; 424/496; 426/89; 426/96; 426/98; 426/100; 426/235

(58) Field of Classification Search ..... 427/213.3; 424/1.29, 1.69, 1.73, 451, 463, 490, 491, 424/493, 496; 426/89, 96, 98, 100, 235
See application file for complete search history.

(56) References Cited

U.S. PATENT DOCUMENTS 3,857,964 A * 12/1974 Yolles ..... 426/3
4,102,806 A 7/1978 Kondo et al.
4,232,047 A * 11/1980 Sair et al. ..... 426/96
4,532,145 A * 7/1985 Saleeb et al. ..... 426/650
4,576,737 A * 3/1986 Johnson ..... 512/4
4,576,826 A * 3/1986 Liu et al.
4,689,235 A * 8/1987 Barnes et al. ..... 426/89
4,828,857 A * 5/1989 Sharma et al. ..... 426/285
5,004,595 A * 4/1991 Cherukuri et al. ..... 424/48
5,009,900 A * 4/1991 Levine et al. ..... 426/96
5,399,368 A * 3/1995 Garwood et al. ..... 426/307
5,460,756 A * 10/1995 Redding, Jr. ..... 264/4
5,496,574 A * 3/1996 Rushmore et al. ..... 426/98
5,506,353 A * 4/1996 Subramaniam ..... 536/103
5,558,889 A * 9/1996 Rossi ..... 426/89
5,580,593 A * 12/1996 Liu et al. ..... 426/96
5,601,865 A * 2/1997 Fulger et al. ..... 426/650
5,603,971 A * 2/1997 Porzio et al. ..... 426/96
5,607,708 A * 3/1997 Fraser et al. ..... 426/96
5,705,207 A * 1/1998 Cook et al. ..... 426/89
5,756,136 A * 5/1998 Black et al. ..... 426/89
5,792,505 A * 8/1998 Fulger et al. ..... 426/650
5,874,102 A * 2/1999 LaJoie et al. ..... 424/438

FOREIGN PATENT DOCUMENTS

| | | |
|---|---|---|
| FR | 2750997 | 1/1998 |
| GB | 825 480 A | 12/1959 |
| GB | 1 318 799 A | 5/1973 |
| JP | 55 026807 A | 2/1980 |
| WO | WO 96/09773 A | 4/1996 |
| WO | WO 96/08724 | 1/1998 |
| WO | WO 01/25414 A1 | 4/2004 |

* cited by examiner

*Primary Examiner*—Nathan M. Nutter
(74) *Attorney, Agent, or Firm*—Hoffmann & Baron, LLP

(57) ABSTRACT

A process for stabilizing a sensitive substance; (a) plating a sensitive substance onto a solid carrier under a controlled atmosphere to reduce loss of the sensitive substance; (b) encapsulating the plated material under controlled atmosphere and airflow to reduce volatilization during the process and stabilize the sensitive substance.

31 Claims, No Drawings

SENSITIVE SUBSTANCE ENCAPSULATION

Matter enclosed in heavy brackets [ ] appears in the original patent but forms no part of this reissue specification; matter printed in italics indicates the additions made by reissue.

*More than one reissue application has been filed for U.S. Pat. No. 6,251,478. The reissue applications are U.S. Ser. No. 09/996,636 (the present application) and U.S. Ser. No. 10/776,035, both of which are divisional reissues of U.S. Pat. No. 6,251,478.*

FIELD OF THE INVENTION

The present invention relates to the encapsulation and stabilization of volatile, and temperature and oxygen sensitive substances.

BACKGROUND OF THE INVENTION

Three are many materials that exist in nature, or are synthesized, that have low stability under ambient conditions. These materials may decompose, disassociate, lose viability, etc. through reaction with oxygen present in the atmosphere, or losing essential components by volatilization at ambient and elevated temperatures. Examples include flavors, flavor compounds, aromas, fragrances, vitamins, nutrients (such as omega 3 oils, carotenoids, vitamin A and E), alcohols, acetones, ketones, aldehydes, organic acids, antioxidants, biologically active substances etc., hereinafter referred to as sensitive materials.

Sensitive materials may have single or multiple components that can be categorized based on their level of volatility. Components that reach the boiling point at low temperatures are categorized as having high volatility, high notes or top notes. An example of a low boiling point component is diacetyl (2,3-Butanedione) with a boiling point of 88° F. (water has a boiling point of 212° F.) Diacetyl is used to bring the characteristic dairy flavor in butter, coffee, and vinegar.

Volatile materials may comprise a single low boiling point component or may comprise a mixture of low, medium and/or high boiling components. The medium and low notes are not volatile at ambient or elevated temperatures (250° F. and above), and are therefore generally unaffected by atmospheric conditions or elevated processing temperatures. Loss of the high notes in volatile materials very often results in a finished product that is out of balance.

The high notes of volatile materials are the most sensitive portions of the product. High notes can be lost through volatilization which is accelerated at temperature above 40° F. Loss of high notes can also occur during storage, incorporation in a food product, processing of a food product, and storage of that food product even under frozen conditions.

There have been attempts to overcome the problems associated with maintaining high notes in a formulation. For instance, over formulation is used to supply the high notes (high volatiles) in greater quantities to compensate for the losses. However, this solution does not address the relative concentrations of differing volatile compounds in the original product versus the resulting product. Furthermore, it is difficult to anticipate how much of the high notes will be lost. In addition, high notes are lost over a period time and the amount of loss can depend on temperature, so that the composition of the volatile material is constantly changing.

Another approach to delivering a balanced composition of high, medium, and low notes has been through encapsulation technology. Early attempts used spray drying and spray chilling technologies to stabilize the flavor and fragrance compositions. With spray drying, a volatile substance is first emulsified in an aqueous solution of a water-soluble protective colloid, such as gelatin, and carbohydrates (e.g. gum arabic, starch, dextrin. The emulsion is then sprayed into a column of heated air or gases to evaporate the water. The resulting dry particles have a water-soluble shell or capsule of the water-soluble colloid in which the volatile substance, such as a flavor, is embedded or encapsulated in the form of minute droplets. Spray chilling is differentiated from spray drying by having the emulsion being sprayed into a column of ambient or chilled air.

U.S. Pat. No. 3,857,964 teaches controlled release flavor compositions which comprise flavor particles having an outer coating of a physiologically inert, water-softenable and swellable material. Flavor particles may be formed by adding and stirring volatile agents, such as cyclic acetal compounds, into a polymeric material. The resulting flavor particles are then coated by stirring them into a sodium alginate solution, passing them through a size-limiting orifice into a room temperature bath of calcium lactate solution.

U.S. Pat. No. 5,607,708 relates to an encapsulated flavoring material formed of an edible, oil-insoluble, water-soluble outer shell surrounding an edible, water-insoluble inner core that is liquid at a temperature of about 45° C. and contains a volatile, oil-soluble flavoring material dissolved or dispersed in the inner core. Materials suitable for the outer shell include gelatin, water soluble gums, starches or dextrins. The cover material may be an unsaturated vegetable oil, fat and/or partially hydrogenated oil or fat. It is important during the manufacture of the core materials that the material have a relatively low melting point so that the volatile components may be mixed with this material at low temperatures, thereby minimizing the loss of the volatile component. Coannular centrifugal extrusion methods may be used to form particles of the core material and simultaneously to coat them with the shell material. Coannular extrusion means are used in U.S. Pat. No. 5,399,368 to produce coated materials in which volatile materials, such as coffee oil, are entrained.

U.S. Pat. No. 5,874,102 teaches encapsulated fatty acid salt products comprising a core material coated with continuous film that serves as a barrier to volatile compounds contained in the core matrix. The particles may then be coated by direct spraying means. Direct spraying of a volatile-containing core material by an aqueous solution of first and second coagulating agents is also shown in U.S. Pat. No. 5,558,889. U.S. Pat. No. 5,004,595 teaches the production of similar coated particles using a fluidized bed process.

U.S. Pat. No. 4,689,235 discloses an encapsulating matrix composition that is extrudable at a pressure in the range of 1 to 10 atm and having an improved loading capacity up to 40% comprising maltodextrin and hydrogen octenylbutanedioate amylodextrin. The matrix may contain from 5 to 40 wt. % of a normally liquid or volatile active ingredient which is added in a tank having heating and agitating means.

U.S. Pat. No. 4,576,826 relates to a method for producing flavorant capsules by forming a stable emulsion of an edible oil and an aqueous essence. The emulsion is directly sprayed or dropped in a dropwise manner onto an agitated powdered edible protein, carbohydrate or mixture thereof to form capsule shells thereon. Frozen essences may be utilized in the form of frozen particles which are added to the coating material prior to curing.

While spray drying and spray chilling were able to transform a liquid flavor into a solid particle, they also had inherent limitations such as the use of large volumes of air. Compounds sensitive to oxygen in air will begin to oxidize and decompose. For example, materials with multiple double bonds such as conjugated linoleic acid, omega 3 oils, fish oils, as well as anaerobes and facultative anaerobes such as, but not limited to, Bifidobacterium sp., and Lactobacillus sp., will lose potency or activity after exposure to oxygen. Additionally, heat is involved in both processes that will cause almost complete volatilization and/or oxidation of the low boilers or sensitive materials even with over formulation.

SUMMARY OF THE INVENTION

An object of the present invention is to provide a method for the encapsulation of temperature/oxygen sensitive materials including flavors, fragrances, nutrients, colors, anaerobic bacteria, and products with similar characteristics without the loss of volatile portions due to reaction with oxygen or elevated temperatures.

A further object of the present invention is to provide protection and prevent undesirable oxidation of alcohols, acetones, ketones, aldehydes, organic acids, and antioxidants.

A further object of the present invention is to provide improved stability of biologically active compounds which include Lactobacilli, Bifidobacterium, Enterococci, phytase, amylases, lipases, invertases, transglutaminases, proteases, lipoxygenases and pentosanases.

The present invention is directed to an encapsulation technique whereby "topnotes" or sensitive substances, which do not typically survive current encapsulation process such as spray drying, spray chilling, and fluid bed technologies, are captured and stabilized.

The invention is directed to a method of encapsulating a sensitive substances some of which require: plating the volatile material onto a solid carrier, in an atmosphere inert to the volatile material, to form a plated material; and encapsulating the plated material.

DETAILED DESCRIPTION OF THE INVENTION

A sensitive substance such as a volatile liquid material is first plated onto a solid carrier in a sealed reactor. The reactor is then filled with nitrogen, carbon dioxide, or any other suitable gas inert to the sensitive substance to displace any unconditioned air. Then the plated material is encapsulated either in the same vessel in which the plating occurred or in another vessel.

The carrier is placed in a vessel capable of being sealed and supporting mechanical mixing. Preferably the mechanical mixing creates a fluidized bed. The vessel is then sealed and then oxygen is displaced through the introduction of an inert gas. Suitable gases include, but are not limited to, carbon dioxide, nitrogen, and helium. The inert gas also acts as a blanket. The inert gas is selected so that it will not react with the volatile material or the carrier. The carrier material is then agitated.

A liquid material (oxygen sensitive liquid material) is then agitated to ensure a fully homogenized mire. Without exposing the liquid material to air or oxygen, the liquid material is then supplied, e.g. pumped, into the sealed vessel and introduced into the vessel by a nozzle. The nozzle is used to form small droplets that are more easily absorbed onto the carrier material. The time involved in spraying is dependent upon the addition level of the liquid onto the solid and the time required to ensure complete absorption to form a free flowing powder. While the volatile liquid material is being added, the carrier is agitated or mixed to ensure even distribution of the liquid material onto the solid carrier.

A typical volatile liquid material has a boiling point between about 40° F. and about 250° F., preferably about 50° to about 100° F., and more preferably about 60° to about 80° F. Examples of volatile materials also include, but are not limited to, flavors, flavor compounds, aromas, fragrances, vitamins, nutrients (such as omega 3 oils, carotenoids, vitamin A and E), alcohols, acetones, ketones, aldehydes, organic acids, antioxidants, and essential oils. Examples of volatile materials are: lemon oil, spearmint oil, vanilla extract, garlic oil, cinnamon extract and other essential oils derived from botanical origins.

Other sensitive materials include biologically active compounds which include, but are not limited to, Lactobacilli, Bifidobacterium, Enterococci, phytase, amylases, lipases, invertases, transglutaminases, proteases, lipoxygenases and pentosanases.

The carrier may be any porous or semi porous material such as, but not limited to, maltodextrin, dextrins silicon dioxide, starches, gums or hydrocolloids. The carrier is selected based upon its ability to entrap the liquid material. Suitable carriers include, but are not limited to, the following. N-ZORBIT M which is a tapioca maltodextrin derived from tapioca and K-4484 which is a tapioca dextrin with high solubility, good clarity, and bland flavoring. N-ZORBIT M and K-4484 are products of National Starch and Chemical Company.

The particle size of the carrier is preferably between about 50 microns and about 2,000 microns, preferably between about 100 microns and about 1000 microns, and more preferably between about 200 and about 500 microns. Both the volatile liquid material and solid carrier may be edible.

Loading levels of the liquid onto the solid carrier are between about 1% and about 70% by weight, preferably 5% to 40%, more preferably between about 10% and about 30%, and most preferably between about 15% and about 25%. One skilled in the art would understand the amount of volatile material needed for a particular end product. For example, garlic is very strong and thus would require a lower loading concentration as would cinnamon. Apple juice would likely require a higher concentration.

Prior to adding the liquid material, the carrier may be chilled by, for example, the addition of liquid nitrogen which has a temperature between minus 198° and minus 208° C. The liquid material may also be chilled to below about 40° F., and kept chilled while it is added to the carrier. If desired, the vessel may also have a cooling jacket to cool the vessel during the plating process.

Any suitable mixer vessel, such as a paddle mixer, ribbon blender, or V-blender, may be used in the present invention to plate the solid onto the carrier.

After the volatile liquid material is plated onto a solid carrier to form a plated material, the plated material is encapsulated either in the same vessel in which the plating occurred or in another vessel. In a preferred embodiment, the plated material is removed from the sealed mixer and placed in a reactor designed to encapsulate solid particles. In either case, the encapsulation reactor must be capable of being sealed. The reactor is then filled with nitrogen, carbon dioxide, or any other suitable gas inert to the volatile material to displace any unconditioned air. Preferably, the vessel has means to agitate and heat the contents of the vessel.

Any suitable encapsulant material may be used. Preferably the encapsulating material is a lipid material such as, but not limited to, mono-, di-, and triacylglycerols, waxes, and organic esters derived from animals, vegetables, minerals, and modifications. Examples include glyceryl triesterates such as soybean oil, cotton seed oil, canola oil, tallow and palm kernal oil, and esters of long chain fatty acids, and alcohols, such as carnauba wax, beeswax, bran wax, tallow and palm kernal oil. The lipid material preferably has a melting point between about 60° and about 200° F.

Specific encapsulants include, but are not limited to, the following. NATIONAL 46 which is a low viscosity product designed for the encapsulation of citrus flavors, such as orange and lemon, and other delicate flavor oils. CAPSUL which is a modified food starch derived from waxy maize designed for encapsulation of flavors, clouds, vitamins, and spices. N-LOK which is a low viscosity product designed for the encapsulation of flavors, fats, oils, and vitamins. NATIONAL, CAPSUL, and N-LOK are all products of National Starch and Chemical Company.

In a preferred embodiment, the encapsulant material is melted and the liquefied material is then pumped into the encapsulation reactor. The flow rate is dependent upon the type of encapsulation reactor used in the procedure and is well within the skill of the art. The carrier containing volatile material is fluidized in the reactor by methods known to those who are skilled in the art such as by forcing an inert gas upward through a bed of particles so that the particles undergo a continuous circular, tumbling action. As the particles are fluidized, the liquefied material is sprayed onto the fluidized particles.

The final percentage of encapsulant (coating) in the resulting encapsulated particles is between about 10 to about 90%, preferably about 20 to about 80% and more preferably between about 30 and about 50% by weight.

EXAMPLES

Example 1

Encapsulation of lyophilized Lactobacillus acidophilus, a temperature and oxygen sensitive biologically active substance A culture of Lactobacillus acidophilus was lyophilized and milled to make powdered product. The powdered product may be used in, for example, gel capsules. However, the powdered product of lyophilized Lactobacillus acidophilus culture can quickly lose its biological potency or activity at ambient conditions without proper storage conditions, such as refrigeration or freezing, since the microorganism is very sensitive to elevated temperatures and moisture. The microorganism is also sensitive to oxygen, although to a lesser degree compared to its sensitivity to moisture, since Lactobacillus acidophilus is facultative. The encapsulation technique described below demonstrates the improved stability of the microorganism under accelerated storage conditions (e.g. 40° C).

Powdered lyophilized Lactobacillus acidophilus culture is introduced into an encapsulation vessel, such as a fluid bed and alike, that has been properly sanitized. Airflow passing through the working space (e.g. a room) enclosing the encapsulation vessel is dehumidified to reduce potential humidity exposure of the microorganism. The microorganism in the vessel is also blanketed with an inert gas, such as nitrogen, to reduce potential oxygen exposure throughout the entire encapsulation process. When the encapsulation process bins, the internal temperature of the microorganism culture in the vessel gradually increases to the range between 60° to 120° F. before spraying a suitable melted coating into the encapsulation vessel. Spraying of the melted coating continues until a desirable level of coating has been applied depending upon the predetermined level of protection. The finished batch, i.e., encapsulated lyophilized Lactobacillus acidophilus, is in turn released from the encapsulation vessel, screened to obtain the appropriate particle size, and packaged.

The following table compares stability of unencapsulated lyophilized Lactobacillus acidophilus (the Control) with two encapsulated Lactobacillus acidophilus with different levels of coating Encap 1 and Encap 2 were encapsulated with 15% and 25% coating, respectively. The encapsulation process significantly affected the activity or biological potency of the original lyophilized Lactobacillus acidophilus as reflected in the 0-day CFU values since the same weights of samples were used for enumeration of the Control, Encap 1 and Encap 2. All lyophilized Lactobacillus acidophilus were stored at refrigeration (4° C., appropriate storage), ambient (20° C., normal distribution channel to retail level), or an elevated (40° C., abusive) temperature for 4 weeks before the evaluation of shelf life by enumeration. By the 4th week, the Control showed at least a 2-log reduction in the population of viable cells compared to Encap 1 and Encap 2, and therefore suggested improved shelf life in the encapsulated forms.

| | Temperature and period (days) of storage | | | | | | | | |
|---|---|---|---|---|---|---|---|---|---|
| | 4° C. | | | 20° C. | | | 40° C. | | |
| Sample | 0[A] | 14 | 28 | 0 | 14 | 28 | 0 | 14 | 28 |
| Control | 4.44[B] | 1.12 | 3.0 | 4.44 | 2.36 | 3.88 | 4.44 | 1.22 | $5.6 \times 10^7$ |
| Encap 1 | 3.76 | 1.2 | 3.88 | 3.76 | 2.0 | 4.92 | 3.76 | 1.6 | $9.2 \times 10^9$ |
| Encap 2 | 3.48 | 1.92 | 2.84 | 3.48 | 1.2 | 2.24 | 3.48 | 1.12 | $9.6 \times 10^9$ |

[A]days of incubation
[B]indicates number × $10^{10}$ cfu/g (or 10,000,000,000 colony forming units/grams)

Example 2

Encapsulation of natural lemon oil using the temperature and/or oxygen sensitive materials process Natural lemon oil is well-known to be susceptible to oxidation. In addition, the oil contains certain high volatile components that contribute to the full flavor profile of lemon oil expected by those who are familiar with the material, such as flavor chemists. The following encapsulation technique has shown to successfully capture the highly volatile components of lemon oil and to result in strong sensory impact when lemon oil is released.

In general, lemon oil is first plated onto a selected carrier, such as starch or maltodextrin, by spraying liquid lemon oil into an appropriate device like a Ribbon blender, a V-blender, or other blender that can thoroughly mix the lemon oil with the carrier. The blender is blanketed with nitrogen or other inert gas throughout the entire plating process to reduce oxidation. The blender may be insulated depending upon the flavor material to be plated. The mixing process in a blanket takes about 10 to 30 minutes according to predetermined loading level of lemon oil, other flavors, or other liquid materials that are sensitive to oxygen and/or elevated temperatures. The plated lemon oil, which is now a mix of solid particles, is in turn discharged into an encapsulation vessel that can be closed and blanketed with nitrogen or other inert gas.

When the encapsulation process begins, the plated lemon oil is gradually heated to the range between 60° to 150° F. in the encapsulation vessel. Melted coating is sprayed into the encapsulation vessel containing plated lemon oil when the batch temperature reaches the target point. Spraying of melting coating stops at the predetermined level of coating, depending upon degree of protection needed for lemon oil or other flavors. The finished product, e.g., encapsulated lemon oil, is then discharged from the encapsulation vessel, screened to appropriate particle size and packaged.

It will be apparent to those skilled in the art that various modifications and variations can be made in the compositions and methods of the present invention without departing from the spirit or scope of the invention. Thus, it is intended that the present invention cover the modifications and variations of this invention provided they come within the scope of the appended claims and their equivalents.

What is claimed is:

1. A method of encapsulating a sensitive material comprising:

(*a*) plating the sensitive material onto a solid carrier, in an atmosphere inert to the sensitive material, to form a plated material; and (*b*) encapsulating the plated material, *wherein encapsulating comprises spraying a melted encapsulant onto the plated material*.

2. The method of claim 1 wherein the atmosphere inert to the sensitive material is nitrogen, carbon dioxide, or helium.

3. The method of claim 1 wherein the solid carrier is chilled prior to plating with the sensitive material.

4. The method of claim 3 wherein the solid carrier is chilled by liquid nitrogen.

5. The method of claim 1 wherein the solid carrier is porous or semi porous.

6. The method of claim 5 wherein the solid carrier is maltodextrin, silicon dioxide, starches and starch derivatives, gums, or hydrocolloids.

7. The method of claim 6 wherein the encapsulation occurs in an atmosphere inert to the sensitive material.

8. The method of claim 7 wherein the atmosphere inert to the sensitive material is oxygen-free.

9. The method of claim 7 wherein the atmosphere inert to the sensitive material is nitrogen, carbon dioxide, or helium.

10. The method of claim 1 wherein the sensitive material has a boiling point of between about 40° F. and 250° F.

11. The method of claim 1 wherein the atmosphere inert to the sensitive material is oxygen-free.

[12. The method of claim 1 wherein the sensitive material is sprayed onto the solid carrier.]

[13. The method of claim 1 further comprising encapsulating the plated material with a melted encapsulant.]

14. The method of claim 1 wherein the percentage of encapsulant in the resulting encapsulated particles is between about 10 to about 90%.

15. The method of claim 14 wherein the percentage of encapsulant in the resulting encapsulated particles is between about 20 to about 80%.

16. The method of claim 1 wherein the sensitive material is a volatile material.

17. The method of claim 1 wherein the sensitive material is an oxygen sensitive material.

18. The method of claim 1 wherein the sensitive material is a biologically active substance.

19. The method of claim 18 wherein the biologically active substance is selected from the group consisting of Lactobacilli, Bifidobacterium, Enterococci phytase, amylases, lipases, invertases, transglutaminases, proteases, lipoxygenases and pentosanases.

20. The method of claim 1 wherein the sensitive material is at last one selected from the group consisting of alcohols, acetones, ketones, aldehydes, organic acids, and antioxidants.

*21. A method of encapsulating a sensitive material comprising:*

(*a*) *introducing the sensitive material into an encapsulation vessel, wherein the atmosphere in the encapsulation vessel is inert to the sensitive material; and*

(*b*) *encapsulating the sensitive material, wherein encapsulating comprises spraying a melted encapsulant onto the sensitive material.*

*22. A method according to claim 21 wherein the sensitive material is lyophilized before being introduced into the encapsulation vessel.*

*23. The method of claim 21 wherein the atmosphere inert to the sensitive material is nitrogen, carbon dioxide, or helium.*

*24. The method of claim 21 wherein the atmosphere inert to the sensitive material is oxygen-free.*

*25. The method of claim 21 wherein the percentage of encapsulant in the resulting encapsulated sensitive material is between about 10 to about 90%.*

*26. The method of claim 25 wherein the percentage of encapsulant in the resulting encapsulated sensitive material is between about 20 to about 80%.*

*27. The method of claim 21 wherein the sensitive material is a volatile material.*

*28. The method of claim 21 wherein the sensitive material has a boiling point of between about 40° F. and 250° F.*

*29. The method of claim 21 wherein the sensitive material is an oxygen sensitive material.*

*30. The method of claim 21 wherein the sensitive material is a biologically active substance.*

*31. The method of claim 30 wherein the biologically active substance is selected from the group consisting of Lactobacilli, Bifidobacterium, Enterococci, phytase, amylases, lipases, invertases, transglutaminases, proteases, lipoxygenases and pentosanases.*

*32. The method of claim 31 wherein the biologically active substance is Lactobacillus acidophilus.*

*33. The method of claim 21 wherein the sensitive material is at least one selected from the group consisting of alcohols, acetones, ketones, aldehydes, organic acids, and antioxidants.*

* * * * *